2 Sheets—Sheet 1.

C. HARRISON.
Porcelain Bowl for Water-Closets.

No. 196,798. Patented Nov. 6, 1877.

Witnesses:
Edw<sup>d</sup> Payson
Geo. W. Miatt

Inventor:
Charles Harrison
Per Edw. E. Lumby
Atty.

N. PETERS, PHOTO-LITHOGRAPHER, WASHINGTON, D. C.

2 Sheets—Sheet 2.

C. HARRISON.
Porcelain Bowl for Water-Closets.

No. 196,798. Patented Nov. 6, 1877.

Witnesses:
Edw<sup>d</sup> Payson
Geo. W. Miatt

Inventor:
Charles Harrison
Per Edw. E. Quimby
Atty.

UNITED STATES PATENT OFFICE.

CHARLES HARRISON, OF NEW YORK, N. Y.

IMPROVEMENT IN PORCELAIN BOWLS FOR WATER-CLOSETS.

Specification forming part of Letters Patent No. 196,798, dated November 6, 1877; application filed June 4, 1877.

*To all whom it may concern:*

Be it known that I, CHARLES HARRISON, of the city and State of New York, have invented a certain Improvement in Water-Closet Bowls, of which the following is a specification:

My improvement relates to that class of water-closet bowls in which the shell of the bowl inclines inwardly toward the soil-opening. In this class of bowls the stream of water for washing the bowl, which is usually injected through a horizontal pipe, is thrown upward by centrifugal action; and if the head of water is very great, it is liable to overflow, owing to the upward deflection of the stream by the inclined circular surface of the bowl.

My invention consists in providing such a bowl with a swelled front, whereby the tendency of the stream of water to rise is diminished after it has passed about half-way around the bowl, because of the less abrupt resistance which the forward portion of the bowl presents. There is an obvious advantage in the oval shape which the bowl has, in that it adapts the closet to the use of a person sitting in an erect position.

By my invention, as all parts of the shell of the bowl incline toward the soil-opening, the size of the pan required is not materially increased, while the advantage of the oval shape and the rearward location of the soil-opening are retained.

The accompanying drawings exhibit a water-closet bowl having the shape I have described, and also having a wide external flange, to answer the purpose of a drip-tray. The drip-tray, however, is not a part of this invention.

Figure 1:
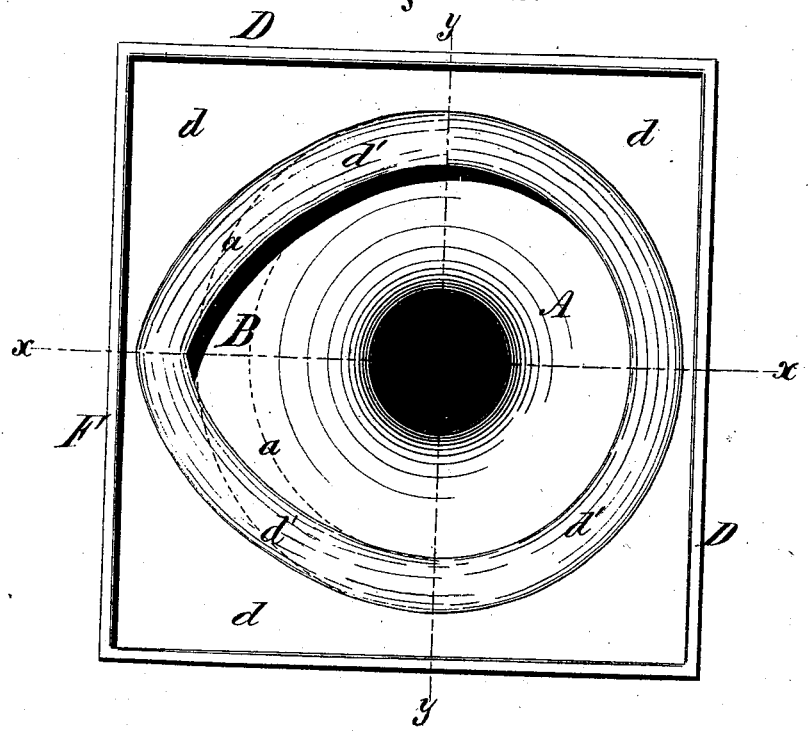
Figure 2:
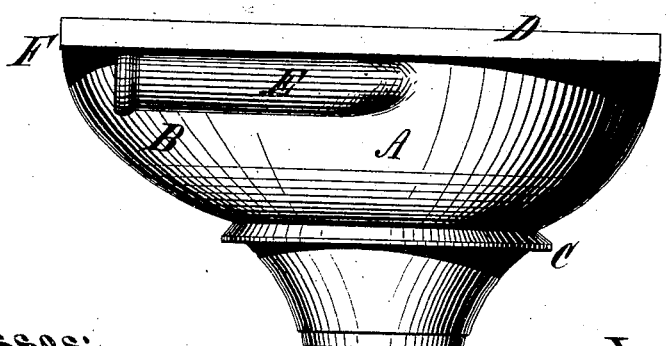
Figure 3:
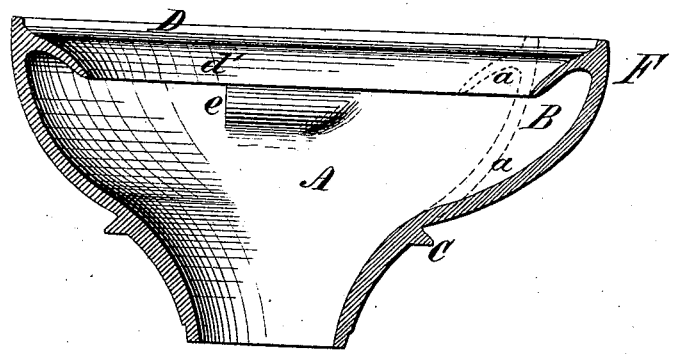
Figure 4:
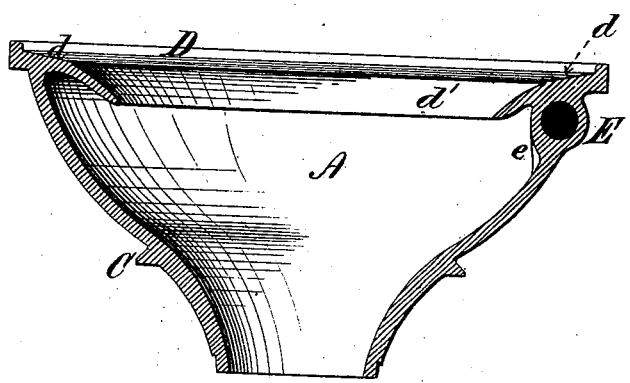

The drawings are as follows: Figure 1 is a top view of the bowl; Fig. 2, a side view, showing the water-arm; Fig. 3, a vertical section from front to rear through the line $x\,x$ on Fig. 1; and Fig. 4, a transverse vertical section through the line $y\,y$ on Fig. 1.

Referring to the drawings, it will be seen that the bowl A is formed with an outward swell, B, on the front side F. The ordinary shape of the front part of the bowl is indicated by the dotted lines $a\,a$ on Figs. 1 and 3.

The bowl has the usual projecting shoulder C, by which it is supported upon the trunk of the closet. It will be seen that the inner side of the front part of the bowl presents a slightly inclined curved surface of considerably enlarged area, by reason of the outward projection of that part of the bowl.

The bowl is washed by a stream of water injected through the water arm or pipe E, which is directed in a slightly downward direction over the rear portion of the interior surface of the bowl by the nozzle $e$. The bowl is provided with the usual inner curved flange at the top.

It will be seen that a stream of water injected into the bowl is deflected upward by the inclined circular surface, upon which it strikes; but when the stream gets around to the side opposite the nozzle or water-arm the interior of the bowl begins to present less resistance to it, because, owing to the swelled front, that portion of the bowl has a less sharp curve. The stream, therefore, at that point, begins to yield to the influence of gravity, and spreads itself over the front part of the bowl without rising farther.

I do not claim a water-closet bowl provided with an inward and outward flange, nor do I claim, broadly, an oval bowl; but

What I claim as my invention is—

An earthenware or porcelain water-closet bowl provided with the swelled front B, and having the whole of its inner surface inclined in greater or less degrees toward the soil-opening, substantially as shown and described.

CHAS. HARRISON.

Witnesses:
 EDWD. PAYSON,
 M. L. ADAMS.